United States Patent [19]

Hayakawa et al.

[11] Patent Number: 4,735,111
[45] Date of Patent: Apr. 5, 1988

[54] BRAKE SUPPORT MECHANISM FOR TRANSMISSIONS

[75] Inventors: Yoichi Hayakawa, Toyota; Kozo Kato, Aichi; Kazuaki Watanabe; Yoshiharu Harada, both of Toyota, Japan

[73] Assignees: Aisin Warner Limited; Toyota Jidosha Kabushiki Kasisha, both of Japan

[21] Appl. No.: 752,527

[22] Filed: Jul. 8, 1985

[30] Foreign Application Priority Data

Jul. 11, 1984 [JP] Japan .................. 59-144803

[51] Int. Cl.$^4$ .......................................... F16H 57/10
[52] U.S. Cl. .................................... 74/785; 192/18 A
[58] Field of Search .............. 74/785, 786, 758, 759, 74/753, 740; 192/13 A, 13 R, 12 C, 18 A, 70.28; 180/244; 188/10, 228.6

[56] References Cited

U.S. PATENT DOCUMENTS

| | | | |
|---|---|---|---|
| 2,918,832 | 12/1959 | Meyers | 192/18 A |
| 3,260,331 | 7/1966 | Bormah, Jr. | 74/785 |
| 3,519,247 | 7/1970 | Christison | 74/785 |
| 3,752,010 | 8/1973 | Tipping | 74/785 |
| 3,770,085 | 11/1973 | Cottingham | 192/18 A |
| 3,926,073 | 12/1975 | Roche et al. | 74/753 |
| 4,075,910 | 2/1978 | Davis et al. | 74/785 |
| 4,186,827 | 2/1980 | Spanke | 192/18 A |
| 4,227,680 | 10/1980 | Hrescak | 74/785 |
| 4,324,321 | 4/1982 | Ushijima et al. | 192/13 R |
| 4,369,671 | 1/1983 | Matsumoto et al. | 74/785 X |
| 4,422,349 | 12/1983 | Matsumoto et al. | 74/785 X |
| 4,426,891 | 1/1984 | Kubo et al. | 74/740 |
| 4,607,541 | 8/1986 | Miura et al. | 74/740 |

Primary Examiner—Lawrence Staab
Assistant Examiner—David Novais
Attorney, Agent, or Firm—Lorusso & Loud

[57] ABSTRACT

Described herein is a brake support mechanism particularly suitable for use in a 4-wheel drive auxiliary transmission to reduce the axial dimensions and to facilitate assembling of the transmission, the brake support mechanism essentially comprising: a transmission case; a cylindrical rotary member mounted in the transmission case; a multiple disk brake constituted by a combination of brake plates splined on the inner periphery of the transmission case and brake disks splined on the outer periphery of the rotary member; a center support fitted in the transmission case in a position adjacent the multiple disk brake; and a hydraulic actuator including an annular cylinder formed in the center support on the side of the multiple disk brake, a piston slidably fitted in the cylinder, an operating fluid supply passage formed in the center support, a return spring located on the outer periphery of the multiple disk brake and having one end thereof abutted against the transmission case, and a return spring mounting member connecting the other end of the return spring to the piston.

8 Claims, 3 Drawing Sheets

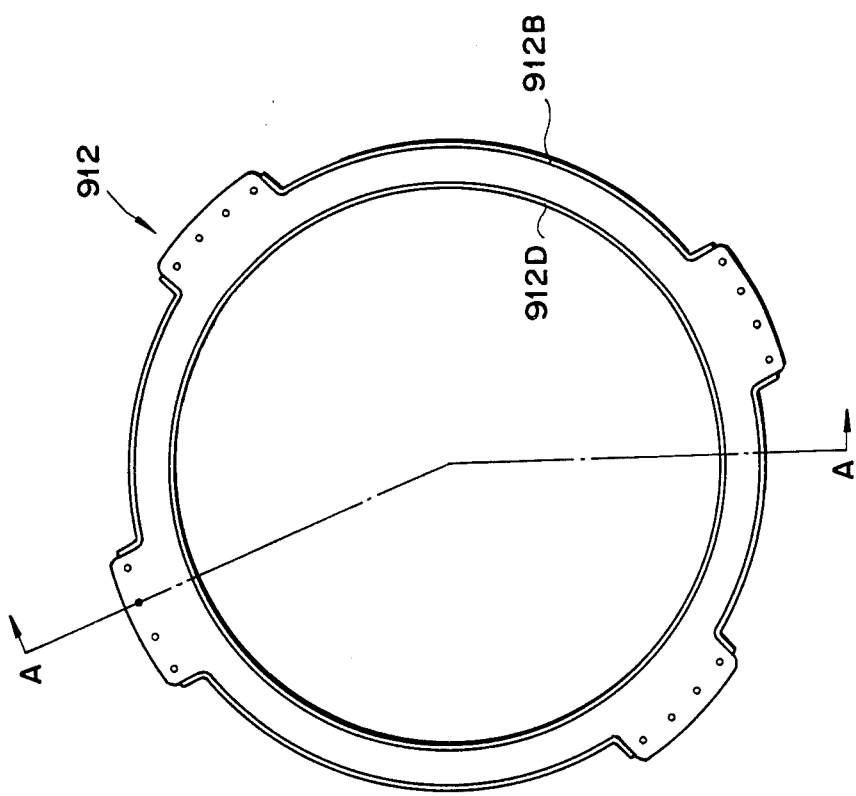

BRAKE SUPPORT MECHANISM FOR TRANSMISSIONS

BACKGROUND OF THE INVENTION (i) Field of the Invention

This invention relates to a brake support mechanism for use in vehicular transmissions.

(ii) Description of the Prior Art

The brake support mechanisms which have thus far been used in vehicular transmissions, for example, for a 4-wheel drive reducing brake which engages and releases a ring gear of a reducing planetary gear set and a 4-wheel drive auxiliary transmission case which accommodates the planetary gear set, is constituted by a multiple disk brake which is splined to the outer and peripheries of the ring gear and the auxiliary transmission case, respectively, a brake piston which presses and releases the multiple disk brake from one side thereof, and a hydraulic cylinder which is formed by casting integrally with the auxiliary transmission case supporting the brake piston. Since the hydraulic cylinder is formed integrally with the auxiliary transmission case, it has been the usual practice to split the auxiliary transmission case into front and rear sections across the brake, for the convenience of assembling the component parts of the auxiliary transmission in the case, resulting in an increased number of parts and complication of machining and assembling processes to ensure the required strength and tightness of the auxiliary transmission case. In addition, reduction of the axial dimension of the auxiliary transmission case has been made difficult by the return spring which is located on the side of the inner periphery of the brake piston to press it toward the hydraulic cylinder at the time of releasing the multiple disk brake.

SUMMARY OF THE INVENTION

It is an object of the present invention to provide a brake support mechanism for transmission, including a hydraulic cylinder for receiving a brake piston and a return spring for pressing the brake piston toward the hydraulic cylinder to release the multiple disk brake, in which the hydraulic cylinder is provided separately from the transmission case and the return spring is located on the outer periphery of the multiple disk brake to reduce the number of split sections of the transmission and at the same time to reduce the axial dimensions of the transmission.

The brake support mechanism for transmission according to the invention comprises: a transmission case; a cylindrical rotary member mounted in the transmission case; a multiple disk brake constituted by a combination of brake plates splined on the inner periphery of the transmission case and brake disks splined on the outer periphery of the rotary member; a center support fitted in the transmission case in a position adjacent the multiple disk brake; an annular cylinder formed in the center support on the side of the multiple disk brake; a piston slidably fitted in the cylinder; an operating fluid supply passage formed in the center support; a return spring located on the outer periphery of the multiple disk brake and having one end thereof abutted against the transmission case; and a hydraulic actuator including a return spring mounting member connecting one end of the return spring to the piston.

The transmission brake support mechanism of the above-described arrangement has the following advantages.

(a) The center support which contains the hydraulic servo is formed separately from the auxiliary transmission, so that the components parts to be mounted in the auxiliary transmission can be assembled successively from one side thereof in a facilitated manner.

(b) The return spring which presses the brake piston toward the center support at the time of releasing the multiple disk brake is located on the outer periphery of the multiple disk brake, permitting to reduce axial dimensions of the auxiliary transmission.

(c) The center support almost the entire side surface of which can be used for the hydraulic cylinder also permits reductions in the axial dimensions of the auxiliary transmission.

The above and other objects, features and advantages of the invention will become apparent from the following description and the appended claims, taken in conjunction with the accompanying drawings which show by way of example a preferred embodiment of the invention.

BRIEF DESCRIPTION OF THE DRAWINGS

In the accompanying drawings:

FIG. 3 is a schematic rear view of a return spring support member; and

FIG. 4 is a section taken on line A—A of FIG. 3.

DESCRIPTION OF PREFERRED EMBODIMENTS

Figure 1:
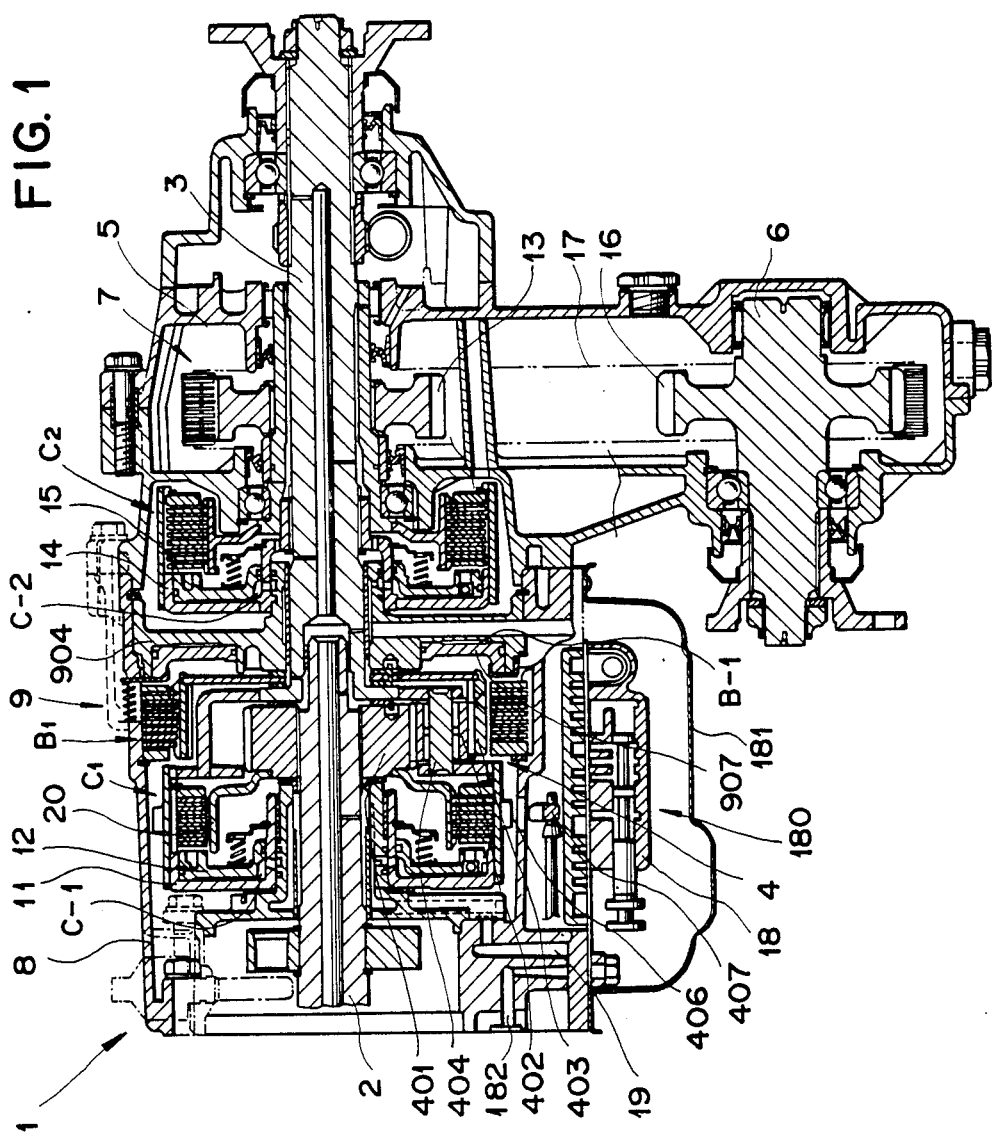
FIG. 1 is a schematic sectional view of a transmission incorporating a brake support mechanism according to the present invention.

Hereafter, the invention is described more particularly by way of a preferred embodiment given in the drawings.

Figure 2:
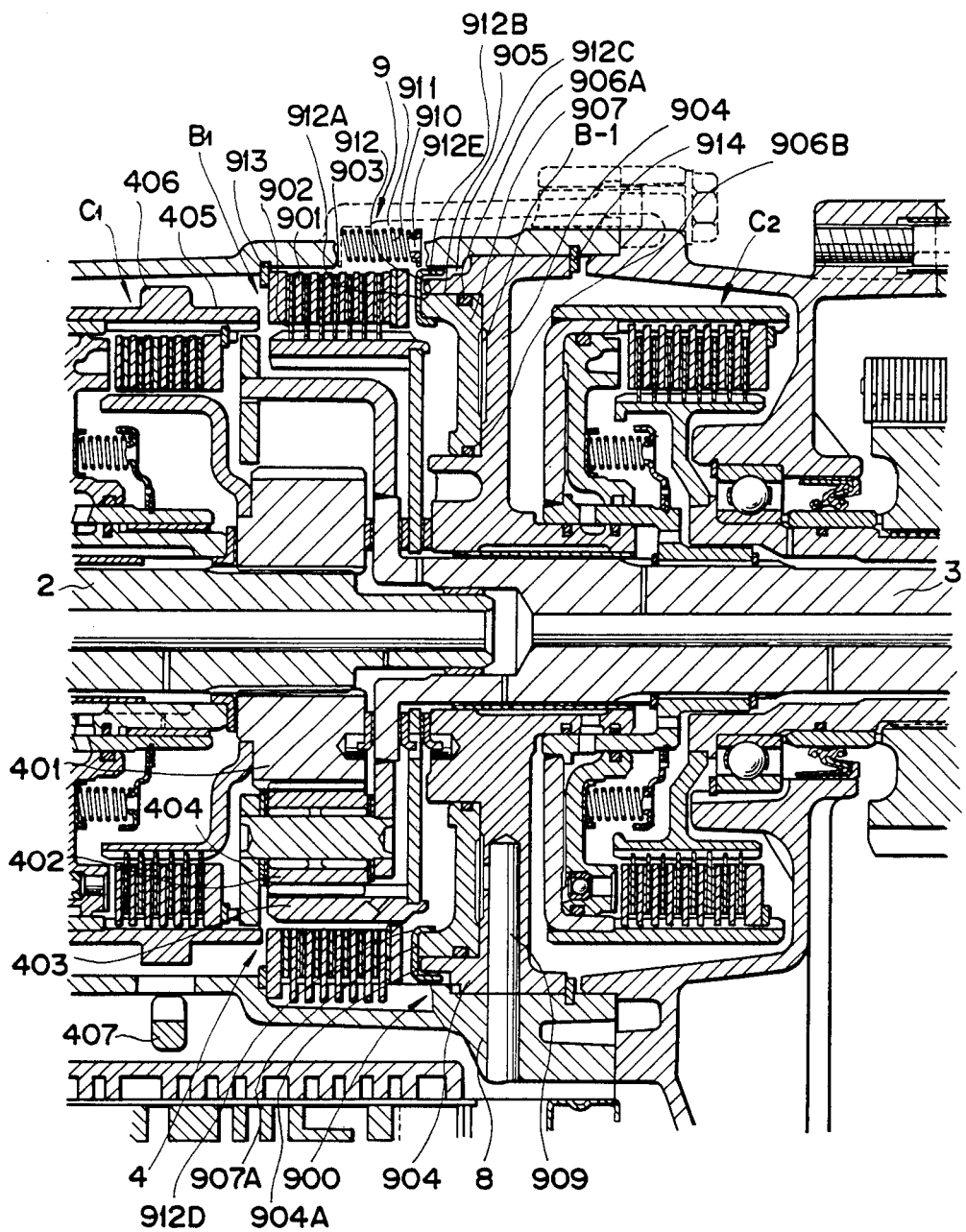
FIG. 2 an enlarged sectional view of the brake support mechanism of FIG. 1.

Referring to FIGS. 1 and 2, there is illustrated a 4-wheel drive auxiliary transmission with a brake support mechanism according to the invention, in which the auxiliary transmission 1 includes: an input shaft 2 which also serves as an output shaft of a main transmission, not shown; a first output shaft 3 of the auxiliary transmission, mounted in series with the input shaft 2; a planetary gear set 4 which is interposed between the input shaft 2 and the first output shaft 3; a 4-wheel drive sleeve 5 rotatably fitted on the first output shaft 3; a second output shaft 6 mounted parallel with the first output shaft 3; and a transfer mechanism 7 which transfers torque between the 4-wheel drive sleeve 5 and the second output shaft 6. The planetary gear set 4 includes a sun gear 401 splined on the rear end of the input shaft 2, pinions 402 meshed with the sun gear 401, a ring gear 403 meshed with the pinions 402, and a carrier 404 rotatably retaining the pinions 402 and coupled with the outer periphery of the first output shaft 3 at the fore end thereof. The auxiliary transmission 1 further includes a clutch C1 which couples and releases the sun gear 401 and carrier 404 to change the operation to 2-wheel drive high speed, 4-wheel drive high speed or 4-wheel drive low speed, a brake B1 which couples and releases the auxiliary transmission case 8 and the ring gear 403, and a clutch C2 which couples and releases the first output shaft 3 and the 4-wheel drive sleeve 5.

The brake support mechanism 9 is applied to the brake B1 in the particular embodiment shown, and includes: a multiple disk brake 903 alternately consisting of brake plates 901 splined to the inner periphery of the auxiliary transmission case 8 and brake disks 902 splined to the outer periphery of the ring gear 403 which constitutes a rotary member in the auxiliary transmission case 8; a center support 904 fitted in the auxiliary transmission case 8 at a position adjacent to the multiple disk brake 903; and a hydraulic actuator including an annular hydraulic cylinder 905 provided in the center support 904 on the side of the multiple disk brake 903, a brake piston 907 fitted in the hydraulic cylinder 905 through O-rings 906A and 906B; a hyraulic servo B-1 formed between the brake piston 907 and the hydraulic cylinder 905; an operating oil supply conduit 909 provided in the center support 904 and auxiliary transmission case 8 to send the operating oil to and from the hydraulic servo B-1, a return spring 910 having one end thereof abutted against the auxiliary transmission case 8 on the outer side of the multiple disk brake 903 to press the brake piston 907 toward the center support 904 at the time of draining the hydraulic servo B-1, a return spring mounting hole 911 for receiving the return spring 910 therein, and a return spring mounting member 912 connecting the other end of the return spring 910 to the brake piston 907. The return spring mounting member 912 consists of a press-formed part having a sectionally U-shaped portion 912A for securing the required strength, annularly holding the outer periphery of an end portion of the center support 904 and an press portion 907A of the brake piston 907 which presses the multiple disk brake 903. The outer peripheral wall 912B of the U-shaped portion 912A is loosely fitted in a space 912C between the center support 904 and the auxiliary transmission case 8, while its inner peripheral wall 912D is fitted in the inner periphery of the press portion 907A of the brake piston 907. A boss portion 912E for attaching the other end of the return spring 910 is provided on the outer periphery of the U-shaped portion 912A on a side away from its open side. The multiple disk brake 903 is supported by a disk fixing member 913 at one side thereof, and the center support 904 is fixed by a center support fixing member 914.

The clutch C1 is located adjacent to the inner periphery of the auxiliary transmission case 8 of the planetary gear set 4 to connect and disconnect the sun gear 401 and the carrier 404, and coupled with the carrier 404. A parking gear 406 which is provided on its outer peripheral portion 405, which is meshed with a brake gear 407 when the shiftlever of an automatic transmission is set in "parking" position. The clutch C1 is operated by a hydraulic servo C-1 which is constituted by a hydraulic cylinder 11 and a clutch piston 12 fitted in the cylinder 11.

The change-over clutch C2 is a hydraulic multiple disk friction clutch for coupling and uncoupling the first output shaft 3 connected to the carrier 404 and the 4-wheel drive sleeve 5 which is connected to an input sprocket 13 of the transfer mechanism 7 for driving the second output shaft 6 of the auxiliary transmission 1, and is operated by a hydraulic servo C-2 which is constituted by a hydraulic cylinder 14 rotatably supported on the center support 904 and a clutch piston 15 fitted in the hydraulic cylinder 14. The transfer mechanism 7 includes the input sprocket 13 splined to the 4-wheel drive sleeve 5, an output sprocket 16 formed on the second output shaft 6, and a chain 17 passed between these sprockets 13 and 16.

Denoted at 18 is an auxiliary transmission valve casing accommodating an auxiliary transmission hydraulic control system which controls the flows of oil pressure to and from the hydraulic servoes C-1, C-2 and B-1 of the clutches C1 and C2 and the brake B1, respectively, and at 181 is an oil pan therefor. The line pressure to be supplied to the hydraulic servos C-1, C-2 and B-1 of the clutches C1 and C2 and brake B1 is led to the auxiliary transmission hydraulic control system 180 in the valve casing 18 through a conduit 182 which is provided in the main transmission case and auxiliary transmission case 8.

In ordinary cruising operation, the line pressure which is supplied to the hydraulic control system of the automatic transmission is fed to the hydraulic servo C-1 through conduit 19 to engage the clutch C1, while draining the hydraulic servos B-1 and C-2 to release the brake B1 and clutch C2. As a result, the sun gear 401 and carrier 404 of the planetary gear set 4 are coupled, delivering power only to the first output shaft 3 from the input shaft 2 at a reduction ratio of 1 to operate in 2-wheel drive mode driving only the rear wheels. In this mode, the power from the input shaft 2 is transmitted from the carrier 404 to the first output shaft 3 through the connecting member 20 fixed to the sun gear 401 and the reduction clutch C1, bypassing the pinions 402 and ring gear 403. If it is desired to change the operation to 4-wheel drive while cruising in 2-wheel drive, a shiftlever (not shown) which is provided besides the driver's seat is manually shifted, supplying the line pressure gradually to the hydraulic servo C-2 from the auxiliary transmission hydraulic control system 180 to engage the clutch C2 smoothly. Whereupon, the first output shaft 3 and the 4-wheel drive sleeve 5 are coupled with each other to transmit the power also to the front wheels through the transfer mechanism 7, second output shaft 6 and propeller shaft (not shown), transmitting the power from the input shaft 2 to the first and second output shafts 3 and 6 at a reduction ratio of 1 to put the operation in 4-wheel drive lock-up mode (high speed 4-wheel drive). If a greater output torque is required for climbing a steep slope, the shiftlever is manually shifted to actuate a change-over valve which switches the operation between high-speed 4-wheel drive and low-speed 4-wheel drive. Whereupon, the line pressure is gradually supplied to the hydraulic servo B-1 and the hydraulic servo C-1 is drained in a suitable timing, thereby slowly engaging the brake B1 and smoothly releasing the clutch C1. As a result, the sun gear 401 and carrier 404 are released, and the ring gear 403 is held stationary, the power of the input shaft 2 is transmitted to the first and second output shafts 3 and 6 after speed reduction through the sun gear 401, pinions 402 and carrier 404 to put the operation in 4-wheel drive of a greater torque (low-speed 4-wheel drive). Table 1 below shows the ranges which are selectable by manual shift of the auxiliary transmission 1, in relation with the modes of operation which are established by engagement or release of the brake B1 and clutches C1 and C2.

TABLE 1

| Ranges | Modes | Friction Elements | | | Reduction ratio |
| | | C1 | B1 | C2 | |
| --- | --- | --- | --- | --- | --- |
| H2 | 2-WD lock-up | O | X | X | 1 |
| H4 | 4-WD lock-up | O | X | O | 1 |

TABLE 1-continued

| Ranges | Modes | Friction Elements | | | Reduction ratio |
|---|---|---|---|---|---|
| | | C1 | B1 | C2 | |
| L4 | 4-WD reduced speed | X | O | O | 1 + 1/r |

In Table 1, the symbols "O" and "X" indicates engaged and released states of the friction elements, respectively. The reduction ratio "r" represents the number of teeth of the sun gear 401/the number of teeth of the ring gear 403 of the planetary gear set 401.

What is claimed is:

1. In a 4-wheel drive auxiliary transmission which receives power through an output shaft of a main transmission, and comprising:
   a case;
   an input shaft connected to the output shaft of said main transmission;
   a first output shaft axially aligned with said input shaft;
   a second output shaft provided in parallel with the first output shaft;
   a first clutch for selectively connecting the first output shaft with the second output shaft;
   a planetary gear set, mounted within the case and connected between the input shaft and the first output shaft and having a sun gear connected to the input shaft, a carrier connected to the first output shaft, a pinion supported by the carrier and meshed with the sun gear, and a ring gear meshed with the pinion; and
   a second clutch selectively connecting the sun gear with the carrier,
   wherein the improvement comprises:
   a brake for selectively braking the ring gear, said brake comprising:
   a brake element assembly including a plurality of brake plates splined on the inner periphery of the case;
   a plurality of brake disks splined on the outer periphery of the ring gear and intermeshed with said plural brake plates;
   an annular cylinder mounted in the case adjacent to the brake element assembly, said annular cylinder comprising radially spaced inner and outer walls;
   a piston slidably fitted in the cylinder, said piston having a depending skirt portion for pressing against said brake element assembly to engage said brake;
   a plurality of return springs located radially outward from the brake element assembly and the piston, each of said return springs having one end attached to the case and a second end connected to the piston to bias the piston toward the cylinder; and
   a return spring mounting member, for connecting the return springs to the piston, said mounting member having a plurality of U-shaped channel portions, which receive both the outer wall of said annular cylinder and the skirt of the piston and engage the brake element assembly, and a plurality of bosses extending radially outward from said channel portions, and secured to said second end of the return springs, thereby connecting said piston to said return springs, said channel portions being defined by an inner cylindrical member which is concentric with and radially inward of said skirt portion of said piston, an outer cylindrical segment which is concentric with and radially outward of said outer wall of said annular cylinder, and an annular, radially extending sidewall member connecting said inner cylindrical member and said outer cylindrical segments and presenting a flat face, wherein the entire surface area of said flat face engages said brake element assembly.

2. A 4-wheel drive auxiliary transmission in accordance with claim 1 wherein said brake plates and brake disks alternate in a series extending along a line parallel to a side wall of said case.

3. A 4-wheel drive auxiliary transmission in accordance with claim 2 wherein said return springs are helix springs having a longitudinal axis parallel to the side wall of said case.

4. A 4-wheel drive auxiliary transmission in accordance with claim 3 having a plurality of said bosses and a plurality of said springs alternately spaced around the interior circumference of said case.

5. A 4-wheel drive auxiliary transmission in accordance with claim 1 wherein said brake plates and brake disks extend radially outward a significant distance beyond said piston.

6. The 4-wheel drive auxiliary transmission of claim 1 wherein said first and second clutches have intermeshed disk and plate elements and wherein said brake plates and said brake disks have a significantly larger diameter than the disk and plate elements of said first and second clutches.

7. The 4-wheel drive auxiliary transmission of claim 1 wherein said annular cylinder is fixed to said case.

8. A 4-wheel drive auxiliary transmission in accordance with claim 1 wherein said bosses are integrally formed with said sidewall member as an extension thereof.

* * * * *